United States Patent
Handke et al.

(10) Patent No.: US 8,800,734 B2
(45) Date of Patent: Aug. 12, 2014

(54) VIBRATION DAMPER WITH AN EXTERNAL PART

(75) Inventors: Günther Handke, Euerbach (DE); Dieter Lutz, Schweinfurt (DE); Janine Bull, Werneck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 2324 days.

(21) Appl. No.: 11/356,544

(22) Filed: Feb. 17, 2006

(65) Prior Publication Data

US 2006/0196742 A1    Sep. 7, 2006

(30) Foreign Application Priority Data

Feb. 18, 2005    (DE) .......................... 10 2005 007 382

(51) Int. Cl.
  *F16F 9/00*    (2006.01)
  *F16M 1/00*    (2006.01)

(52) U.S. Cl.
  USPC .................. 188/322.19; 188/322.12; 188/381

(58) Field of Classification Search
  USPC ............... 188/322.12, 322.19, 381, 130, 131; 267/64.26, 136, 141.7, 220; 280/776, 280/124.145; 248/658, 636, 638
  See application file for complete search history.

(56) References Cited

U.S. PATENT DOCUMENTS

| 4,531,618 | A |   | 7/1985  | Kobiske et al. |
| 4,555,096 | A | * | 11/1985 | Pryor .......................... 267/64.21 |
| 5,308,032 | A |   | 5/1994  | Ohta |
| 5,636,831 | A | * | 6/1997  | Gubitz ........................ 267/64.24 |
| 5,667,203 | A | * | 9/1997  | Romer ........................ 267/64.23 |
| 6,126,198 | A |   | 10/2000 | Handke et al. |
| 6,343,804 | B1 |  | 2/2002  | Handke et al. |

FOREIGN PATENT DOCUMENTS

| DE | 85 07 642.2   |     | 6/1985  |
| DE | G 94 17 357.5 |     | 2/1995  |
| DE | 43 31 976     |     | 3/1995  |
| DE | 196 17 898    |     | 11/1997 |
| DE | 198 15 215    |     | 12/1998 |
| DE | 198 15 215    | A1  | 12/1998 |
| DE | 100 36 048    |     | 2/2001  |
| DE | 103 18 537    |     | 11/2004 |
| DE | 103 18 537    | A1  | 11/2004 |
| GB | 1 356 261     |     | 6/1974  |
| GB | 2 309 947     |     | 8/1997  |
| GB | 2 309 947     | A   | 8/1997  |
| JP | 2003028230    |     | 1/2003  |

* cited by examiner

*Primary Examiner* — Melody Burch
(74) *Attorney, Agent, or Firm* — Cozen O'Connor

(57) ABSTRACT

Vibration damper includes a tubular body to which an external part, which acts as a stop, is fastened. A component such as a steering knuckle, which is supported against the stop, is also fastened to the tubular body. When a normal load on the component is exceeded, a deformation area allows the component to shift on the tubular body.

10 Claims, 5 Drawing Sheets

VIBRATION DAMPER WITH AN EXTERNAL PART

BACKGROUND OF THE INVENTION

1. Field of the Invention

The invention pertains to a vibration damper with an external such as a steering knuckle fastened to a tubular body.

2. Description of the Related Art

A spring strut with a steering knuckle is known from U.S. Pat. No. 6,343,804. This steering knuckle is clamped to the tubular body of the spring strut by a band clamp-like component. To position the steering knuckle in the circumferential and axial directions, an external part is used, which has a tongue-like projection, which engages in a slot in the band clamp-like component. The end surfaces of the external part facing the steering knuckle serve the function of an axial stop. A weld is proposed to connect the external part to the tubular body.

The clamping force of the clamped connection is determined by many factors. Thus the surface roughness of the tubular body and of the mounting opening of the band clamp-like component have a certain effect. In addition, the nature of the paint on the tubular body and the pretension of the fastening means in the band clamp-like component must also be considered.

If all the possible error tolerances become unfavorably superimposed on each other, the possibility that the steering knuckle will shift on the tubular body at very fast inward-travel speeds, e.g., when driving over extreme potholes, cannot be excluded. Excitations on this order of magnitude, however, are very rare during the life of an automobile. But if an event such as this has occurred, the possibility that the steering knuckle has shifted in an uncontrolled manner and thus caused an undesirable change in the geometry of the entire vibration damper cannot be excluded.

One of the first solutions which might be attempted could have the goal of increasing the surface roughness of the components participating in the clamped connection. This, however, leads to problems with the application of the paint, and the paint itself can have a negative effect on these roughness-increasing measures. Under certain conditions, it would also be possible to increase the pretension of the band clamp-like component, but then it would be necessary to increase the wall thickness of the tubular body, and this would increase the weight of the vibration damper too much.

SUMMARY OF THE INVENTION

The object of the present invention is to improve a vibration damper with an external part in such a way that the functionality of the vibration damper remains preserved even after it has been subjected to extreme loads.

According to the invention, a deformation area allows the component to shift on the tubular body when a predetermined load on the component is exceeded.

The great advantage is that the vibration damper can continue to be made out of thin-walled and therefore lightweight components. The deformation area has the effect of providing an additional retaining force, which increases progressively until the stop goes into action to provide the maximum support force. After an extremely abrupt inward travel movement, it can be determined by simple visual inspection whether or not the deformation area has been called into service.

It is possible to provide the deformation area in the external part or in the component, e.g., the steering knuckle.

In one embodiment, the deformation area is determined by a cut-out area, which allows certain volume components of the stop to shift toward the remainder of the external part.

A cut-out area such as this can be designed, for example, as a slot.

Alternatively, at least one deformable contact surface can be provided between the stop and the component.

According to an advantageous embodiment, the component can slide on the stop during a shifting movement. By means of this measure, an additional clamping force is produced between the stop and the component.

In another advantageous embodiment, the component has a receptacle for a partial area of the stop. The receptacle ensures that the deformation will proceed in a defined manner.

In addition, the stop can be deformable in the axial and/or radial direction. The support force of the stop can thus be designed more effectively to satisfy specific requirements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
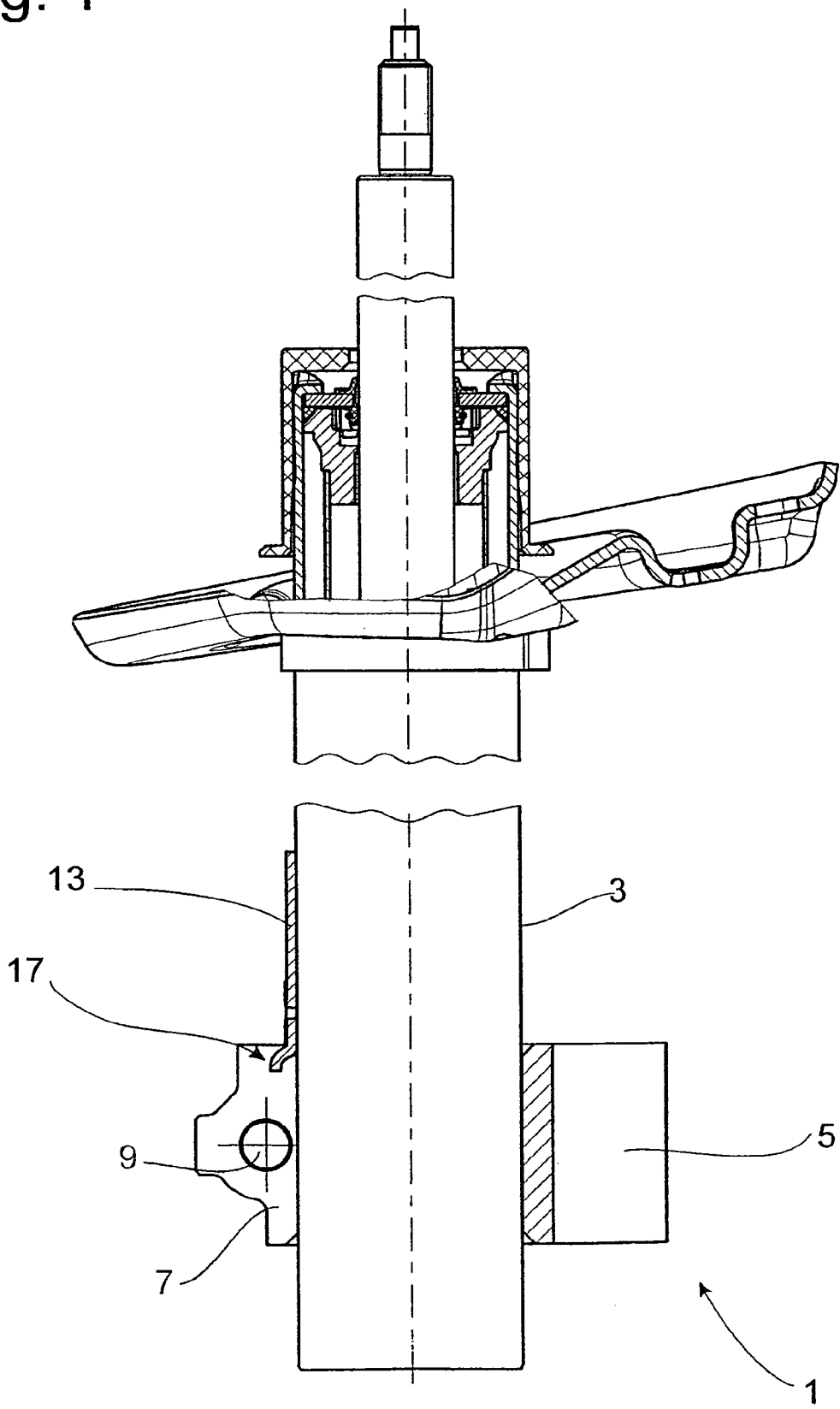
FIGS. 1 and 2 show a vibration damper with an external part, which has a cut-out area in the form of a slot.
Figure 2:
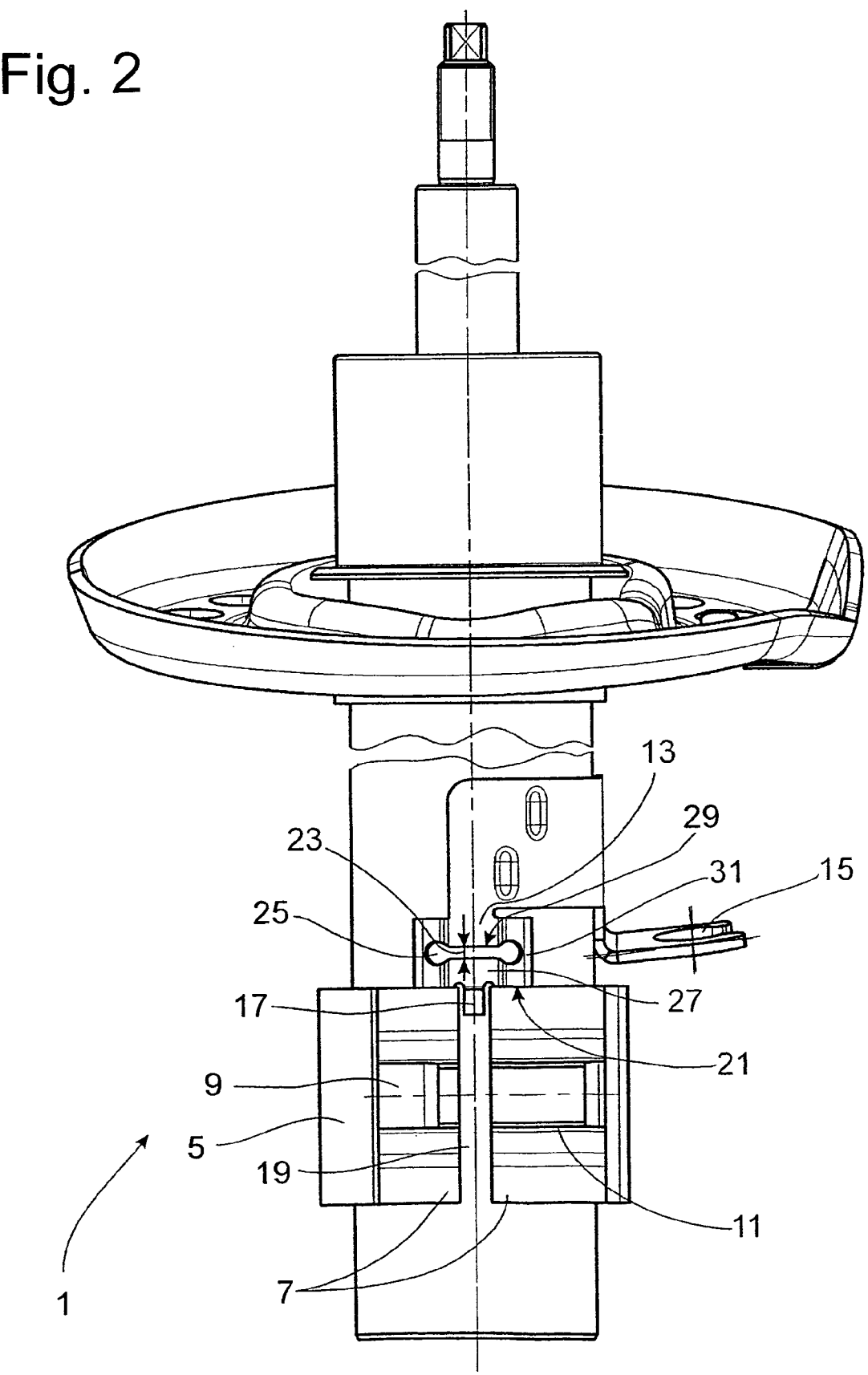

FIGS. 1 and 2 show two views of a vibration damper 1 in the form of a spring strut. A component 5 with the function of a steering knuckle is fastened to the tubular body 3 of the strut. The steering knuckle has in this case a clamp collar 7, which can be tightened onto the tubular body 3 by the use of a fastener (not shown) passing through an opening 9. FIG. 2 shows a threaded bore 11 for the fastener means. In principle, the steering knuckle could be bonded to the tubular body with an adhesive.

An external part 13 is also fastened, preferably welded, to the tubular body 3. This external part serves as an assembly stop for the steering knuckle 5. If desired, the external part 13 can also provide other functions such as that of a brake hose bracket 15. The external part has a tongue-like projection 17, which engages in the gap 19 formed between the two halves of the clamp collar 7. The projection 17 positions the steering knuckle in the circumferential direction during assembly. In addition, the axial position of the steering knuckle is determined by an end surface 21, which faces the steering knuckle. Once the steering knuckle has assumed its correct position, the clamp collar is fixed in place by the fastening means. The tightening torque for the fastener is defined in advance and is designed to accommodate the normal loads and service life of the vibration damper, so that tubular bodies with the thinnest possible walls and therefore of the lightest possible weight can be used.

Extreme potholes, which occur very rarely or possibly not at all during the life of a vibration damper, lead to axial forces on the steering knuckle which cannot be reliably absorbed by the clamped connection between the clamp collar and the tubular body. So that the external part 13 will not come loose from the tubular body, a deformation area 23 is provided, which allows the steering knuckle to shift position on the tubular body. The size of the deformation area is designed so that the driving behavior of the vehicle is not negatively affected. In this exemplary embodiment, the deformation area is provided in the external part 13. For this purpose, the external part has a cut-out area 25 in the form of a slot, which is parallel to the end surface of the external part 13. A remaining web of material 27 between the end surface 21 and the slot 25 can be pushed until it makes contact with the upper lateral surface 29 of the slot. The remaining lateral webs 31 of the external part are deformed as a result and thus provide a resistance force which opposes further shifting. Experiments have shown that the tubular body 3 is not damaged by the forces acting on the external part and that the shifting distance can be comparatively short. After driving over an extreme pothole, even a layperson can often tell very quickly whether or not the deformation area has been completely used up and that it is necessary to replace the vibration damper.

Figure 3:
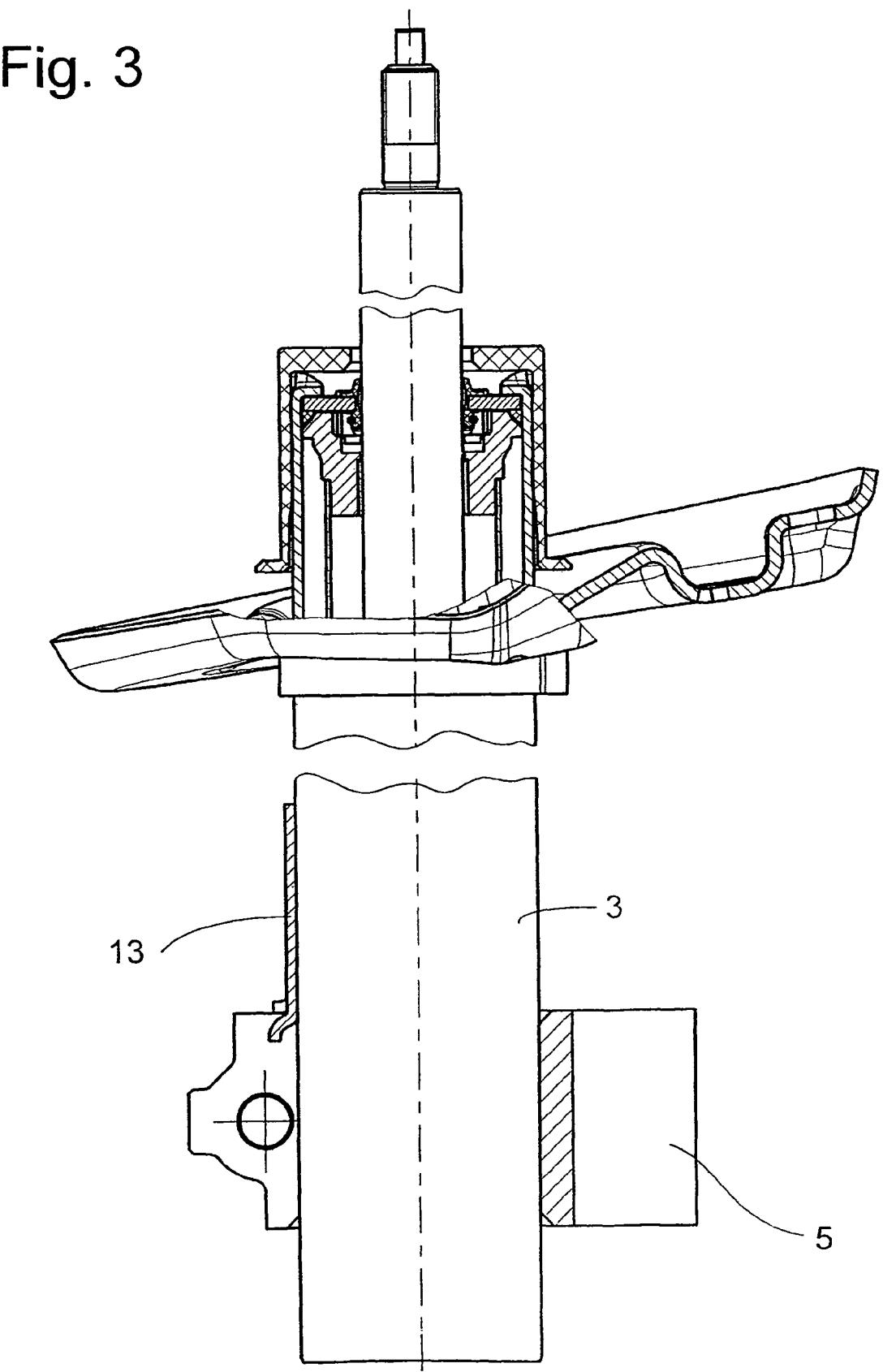
FIGS. 3 and 4 show a vibration damper with an external part, which has a deformation area in the form of projections.
Figure 4:
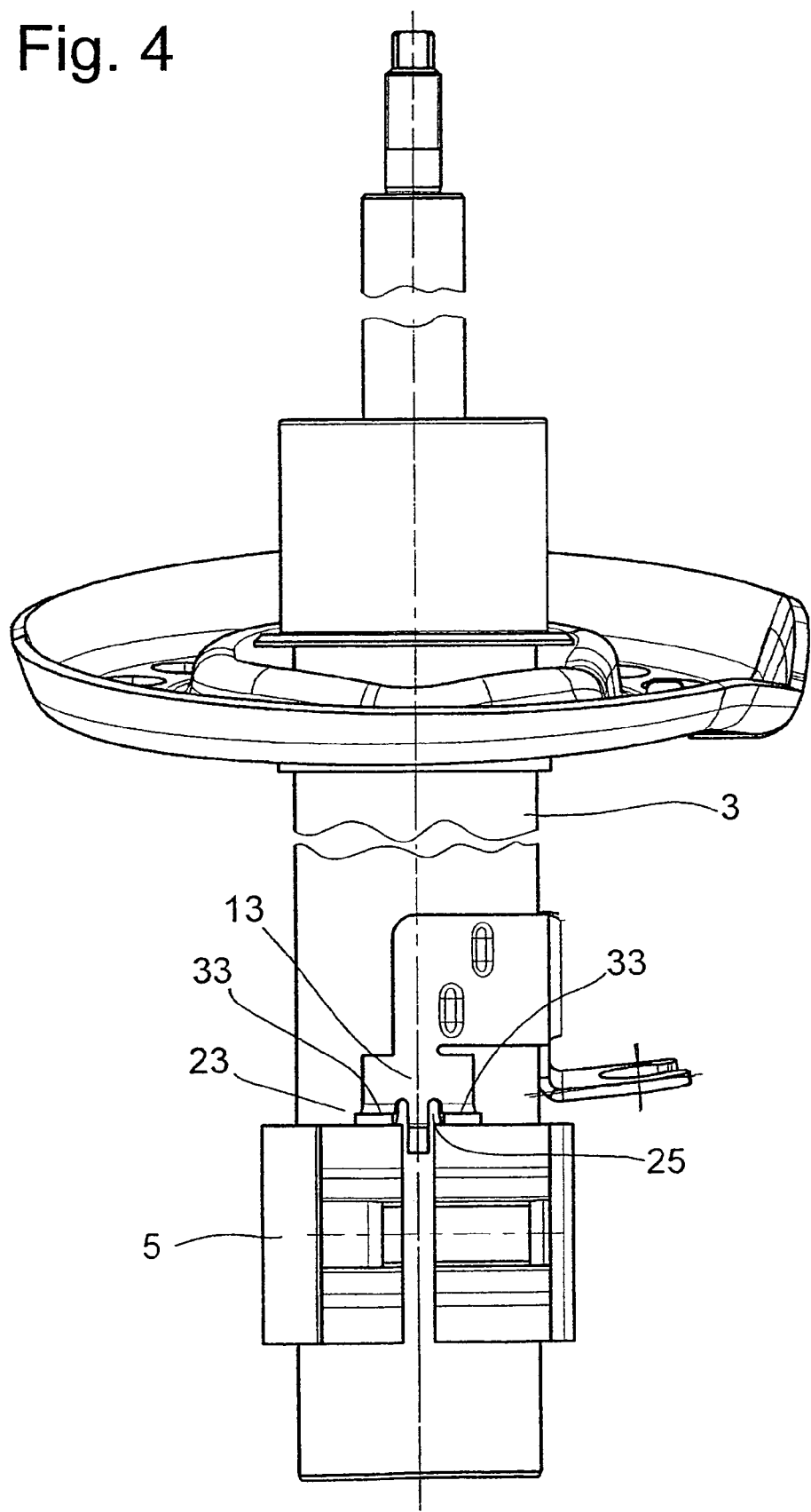

In the variant according to FIGS. 3 and 4, the external part has two deformation areas 23, which are formed by angled sidepieces 33 and which are separated from the external part by cut-out areas. The sidepieces form deformable contact surfaces, which can be deformed by a distance equal to the axial depth of the cut-out areas 25. Depending on the angle of the sidepieces to the steering knuckle, the external part 133 can undergo either elastic or plastic deformation. The resistance forces opposing the shifting movement of the steering knuckle behave similarly.

Figure 5:
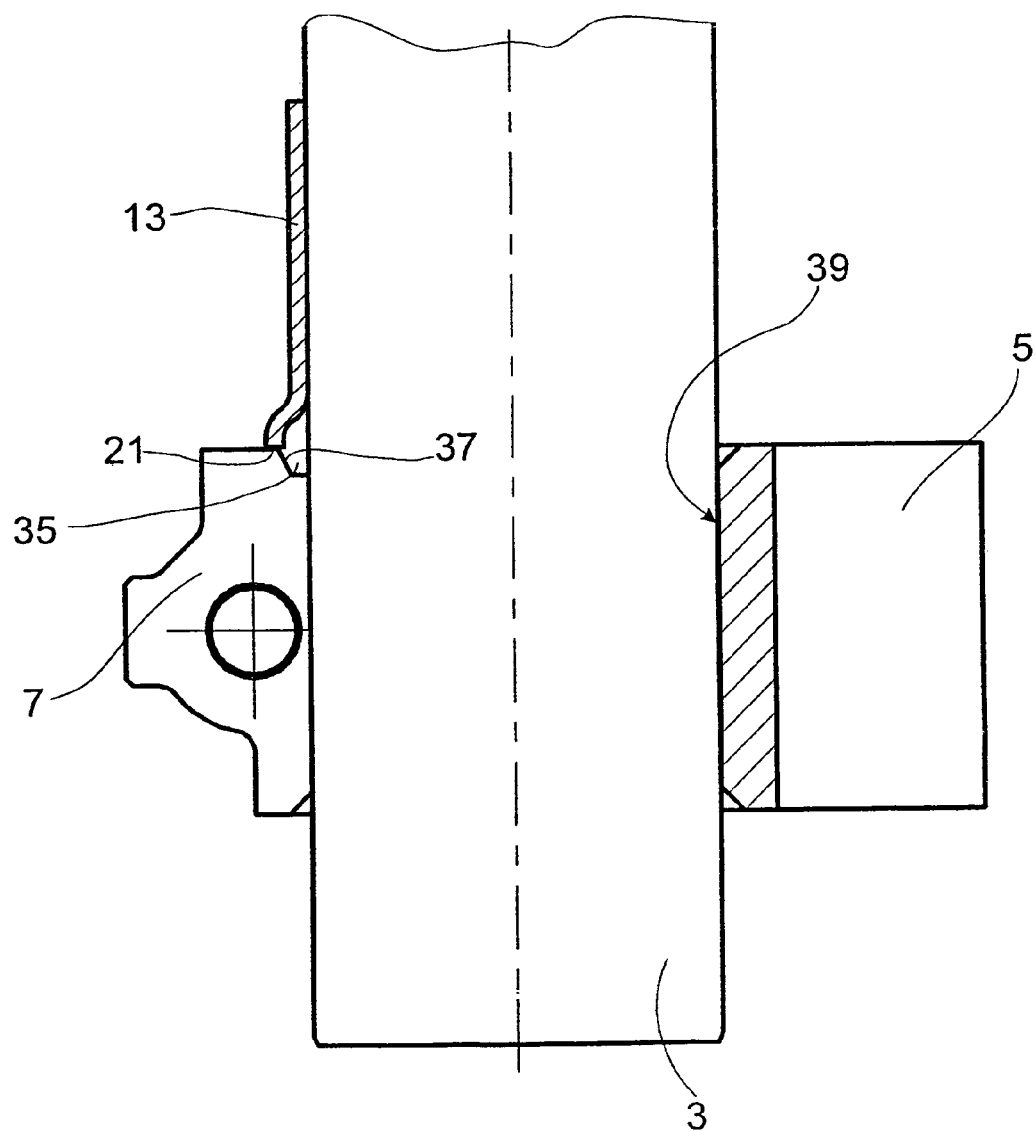
FIG. 5 shows a component with a deformation area.

The purpose of FIG. 5 is to show that the deformation area 23 can also be present in the component 5, i.e., in the steering knuckle. For this purpose, the component 5 has a receptacle 35 for a partial area of the external part 13, i.e., of the stop. During normal operation, the end surface 21 of the external part rests on the top edge of the clamp collar 7. When the load on the steering knuckle exceeds a normal value, the stop slides into the receptacle 35 and deforms, for example, a beveled surface 37 of the receptacle. The stop can thus be deformed radially, and the component 5 can slide on the stop 13 during a shifting movement. With this solution, advantage can be taken of several additional support forces to oppose the shifting movement. First, the forces involved in the deformation of the steering knuckle, the surface of which is abraded in the area of the bevel 37, are active here. Other forces arise from the radial deformation of the stop, and the clamping force of the clamp collar 7 is increased by the wedging of the stop in the mounting opening 39 of the clamp collar 7.

All of the solutions showed here make it possible for a vehicle to continue to be driven safely even after its vibration damper has had to endure an extremely abrupt inward-travel movement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper comprising:
a tubular body;
a stop fastened directly to the tubular body;
a component fastened to the tubular body and supported against the stop; and
a deformation area formed as part of one of said stop and said component, said deformation area deforming to allow said component to shift on said tubular body when a force on said component exceeds a predetermined load, said deformation area being configured so that a functionality of the vibration damper remains preserved after the deforming of the deformation area.

2. The vibration damper of claim 1 wherein the deformation area is formed as part of said stop.

3. The vibration damper of claim 1 wherein the deformation is formed as part of said component.

4. The vibration damper of claim 1 wherein said one of said stop and said component comprises a cut-out area which forms said deformation area.

5. The vibration damper of claim 4 wherein said cut-out area is in the form of a slot.

6. The vibration damper of claim 1 wherein the deformation area comprises a contact surface where said component contacts said stop.

7. The vibration damper of claim 1 wherein said component is designed to slide on said stop during deformation.

8. The vibration damper of claim 7 wherein said component comprises a receptacle which receives part of said stop during deformation.

9. The vibration damper of claim 2 wherein the stop can be deformed in at least one of an axial and a radial direction.

10. The vibration damper of claim 1, wherein the load on said component is an axial load.

* * * * *